US010562057B2

(12) United States Patent
Nemeth

(10) Patent No.: US 10,562,057 B2
(45) Date of Patent: Feb. 18, 2020

(54) ILLUMINATION FOR GREASE GUN NOZZLES

(71) Applicant: Michael L. Nemeth, Barberton, OH (US)

(72) Inventor: Michael L. Nemeth, Barberton, OH (US)

(*) Notice: Subject to any disclaimer, the term of this patent is extended or adjusted under 35 U.S.C. 154(b) by 23 days.

(21) Appl. No.: 15/846,904

(22) Filed: Dec. 19, 2017

(65) Prior Publication Data

US 2019/0184418 A1 Jun. 20, 2019

(51) Int. Cl.
*B05B 15/60* (2018.01)
*B05B 1/30* (2006.01)
*F21V 23/04* (2006.01)
*F21V 17/10* (2006.01)
*B05B 9/04* (2006.01)
*F16N 3/12* (2006.01)
*F21L 4/00* (2006.01)
*F21V 33/00* (2006.01)
*F21V 21/08* (2006.01)
*F21Y 115/10* (2016.01)

(52) U.S. Cl.
CPC ............ *B05B 15/60* (2018.02); *B05B 1/30* (2013.01); *B05B 9/0403* (2013.01); *F16N 3/12* (2013.01); *F21L 4/00* (2013.01); *F21V 17/10* (2013.01); *F21V 21/08* (2013.01); *F21V 23/0421* (2013.01); *F21V 33/00* (2013.01); *F21Y 2115/10* (2016.08)

(58) Field of Classification Search
CPC ......... B05B 15/60; B05B 1/30; B05B 9/0403; F21V 17/10; F21V 23/0421; F21V 21/08; F21V 21/084; F21V 19/00; F21V 17/12; F21V 17/00; F21V 21/088; F21V 21/0885; F21Y 2115/10
See application file for complete search history.

(56) References Cited

U.S. PATENT DOCUMENTS

| | | | | | |
|---|---|---|---|---|---|
| 2,240,195 | A | * | 4/1941 | Reiber | F16B 2/06 222/113 |
| 3,035,738 | A | * | 5/1962 | Bloom | F16N 5/02 222/113 |
| 3,550,824 | A | * | 12/1970 | Bohanski | F21V 21/08 224/197 |
| 3,807,606 | A | * | 4/1974 | Foerst | F16N 3/12 222/262 |

(Continued)

*Primary Examiner* — Bao Q Truong
(74) *Attorney, Agent, or Firm* — Renner, Kenner, Greive, Bobak, Taylor & Weber Co., L.P.A.

(57) ABSTRACT

An adapter to provide illumination at a grease gun nozzle and a method of attaching the adapter to a grease gun is presented. The adapter comprises a body having a threaded aperture, a non-threaded aperture, and a light source secured within the non-threaded aperture such that the distal end of a dispensing hose of a grease gun extends out of the adapter once the adapter is coupled to the dispensing hose. To attach the adapter to a dispensing hose of a grease gun, one must first unscrew the dispensing nozzle from the distal end of the dispensing hose. Next, the adapter is coupled to the distal end of the dispensing hose using the threaded aperture of the adapter. Finally the dispensing nozzle is screwed back on to the distal end of the dispensing hose that is extending out of the adapter.

18 Claims, 3 Drawing Sheets

(56) References Cited

U.S. PATENT DOCUMENTS

| | | | | |
|---|---|---|---|---|
| RE28,537 E | * | 9/1975 | Vickers, III | F21V 33/0064 |
| | | | | 222/192 |
| 5,727,346 A | * | 3/1998 | Lazzarini | F41G 1/35 |
| | | | | 42/146 |
| 7,066,615 B2 | * | 6/2006 | Diggle, III | B25B 23/18 |
| | | | | 362/119 |
| 7,828,119 B1 | * | 11/2010 | Schirado | F16N 3/12 |
| | | | | 184/105.2 |
| 2004/0118870 A1 | * | 6/2004 | Wu | F16N 3/12 |
| | | | | 222/113 |
| 2014/0177239 A1 | * | 6/2014 | Wyatt, III | F21V 19/00 |
| | | | | 362/382 |

* cited by examiner

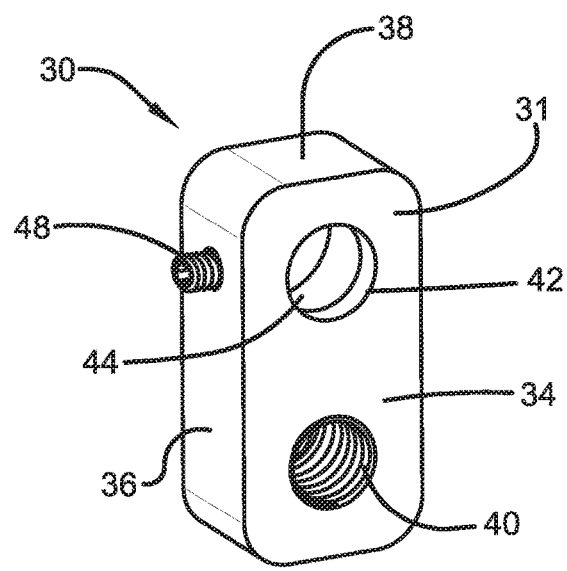
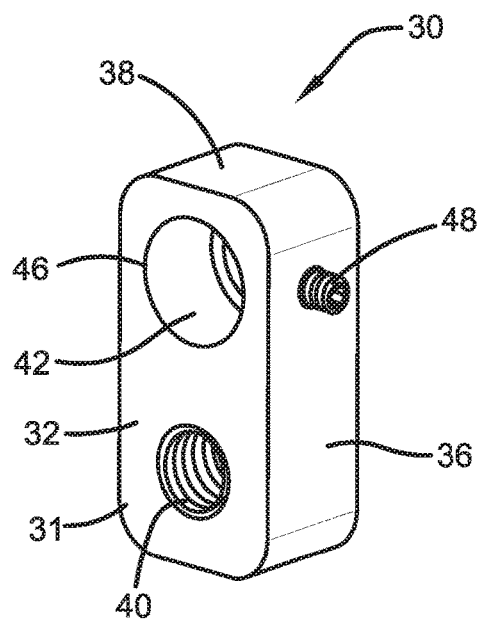
FIG. 2                FIG. 3
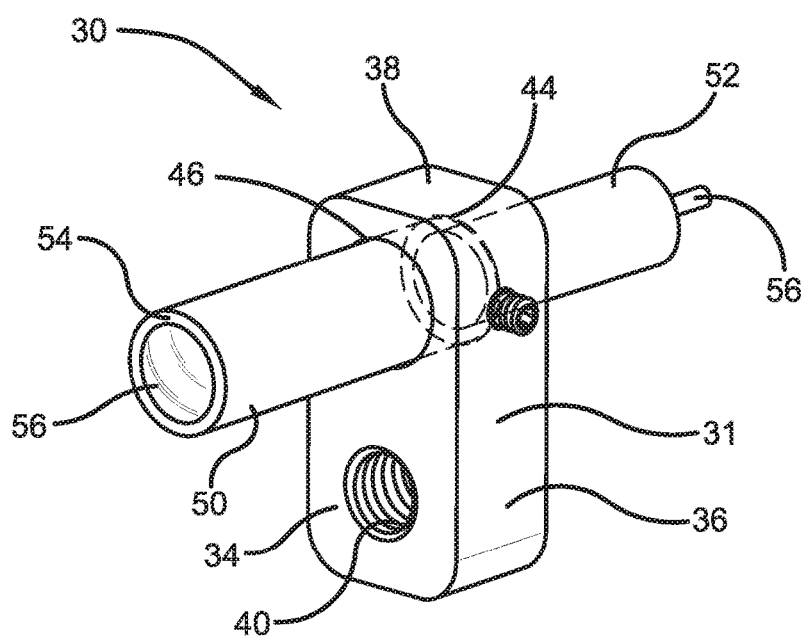
FIG. 4

ILLUMINATION FOR GREASE GUN NOZZLES

FIELD OF THE INVENTION

The invention herein resides in the art of adapters and attachments for a grease gun. Specifically, the invention relates to an adapter attached to the nozzle of a grease gun. Most particularly, the invention relates to an adapter attached to the nozzle of a grease gun that provides illumination by means of a light source so as to provide the user with the ability to better see the area that is to be greased.

BACKGROUND OF THE INVENTION

Handheld powered lubricators, commonly known as "grease guns" have extensive use for servicing bearings and other components of vehicles, farming equipment, and industrial machines. A grease gun typically includes a pump having a reciprocal plunger, a reservoir of grease, and a discharge hose.

Grease guns have been in use for years. Some grease guns have a pump that can be manually powered by being pumped with one hand of the user while the other hand of the user directs the hose so as to deliver grease onto the area to be greased. There are also grease guns powered by either a battery or an air pump. With these grease guns, a trigger is pressed, while holding the grease gun with one hand, and the hose is directed with the other hand onto the area to be greased.

In some grease guns, the discharge hose is in the form of a flexible hose, and the user must make sure to keep one hand on the grease gun, and the other hand on the flexible hose. These types of grease guns are useful because they allow for the user to more easily access grease fittings, which are often in hard to reach places. In other grease guns, it is known to have the discharge hose be in the form of a rigid hosepipe, which allows for users to not have to utilize their free hand to guide the hose. However, with these grease guns, it is often difficult or impossible to reach many grease fittings due to the rigidity of the hosepipe.

Regardless of the type of hose utilized by the grease gun, grease fittings are often located in places that are hard to see. Grease fittings are often located in dark and hard to reach places. Not being able to properly see the grease fitting to which grease is being applied is a problem for many technicians. A lack of ability to readily locate the grease fitting will not only consume unnecessary time, but may lead to either too much grease being applied, or not enough, simply because the technician cannot see how much grease is needed for the particular grease fitting. This waste of time and grease is of course undesirable. There is therefore a need for a simple and cost effective way to ensure that there is an adequate amount of light on the grease fitting to allow for technicians to readily access and properly grease the fittings.

SUMMARY OF THE INVENTION

The needs apparent from the deficiencies of the prior art as noted above are satisfied by various embodiments of the invention presented directly below and as will become apparent in detail with reference to the drawings and detailed description.

In a first embodiment, the present invention provides an adapter for a grease gun comprising a body having a threaded aperture, a non-threaded aperture, and a light source secured within the non-threaded aperture.

In a second embodiment, the present invention provides an adapter for a grease gun as in the first embodiment, wherein the body further comprises a front side, a back side, two side portions, and rounded top and bottom portions.

In a third embodiment, the present invention provides an adapter for a grease gun as in either the first or second embodiment, wherein the non-threaded aperture has a front opening on the front side of the body, and a back opening on the back side of the body, and wherein the diameter of the front opening is larger than the diameter of the back opening.

In a fourth embodiment, the present invention provides an adapter for a grease gun as in any of the first through third embodiments, wherein the body further comprises a setscrew located on one of the two side portions adjacent to the non-threaded aperture.

In a fifth embodiment, the present invention provides an adapter for a grease gun as in any of the first through fourth embodiments, wherein the light source is secured within the non-threaded aperture by a back end of the light source being frictionally fit within the back opening of the non-threaded aperture and further being secured by a setting of the setscrew such that a front end of the light source extends out of the adapter through the front opening of the non-threaded aperture.

In a sixth embodiment, the present invention provides an adapter for a grease gun as in any of the first through fifth embodiments, wherein the light source is a LED flashlight.

In a seventh embodiment, the present invention provides an adapter for a grease gun as in any of the first through sixth embodiments, wherein the threaded aperture is designed so as to mate with a distal end of a dispensing hose of a grease gun.

In an eighth embodiment, the present invention provides a method of attaching a light source adapter to a dispensing hose of a grease gun comprising: unscrewing a dispensing nozzle from a distal end of the dispensing hose; coupling the light source adapter to the distal end of the dispensing hose, the adapter comprising a body having a threaded aperture, a non-threaded aperture, and a light source secured within the non-threaded aperture such that the distal end of the dispensing hose extends out of the adapter once the adapter is coupled to the dispensing hose; and screwing on the dispensing nozzle to the distal end of the dispensing hose extending out of the adapter.

In a ninth embodiment, the present invention provides a method of attaching a light source adapter to a dispensing hose of a grease gun as in the eighth embodiment, wherein the dispensing hose is coupled to the adapter by means of the threaded aperture.

In a tenth embodiment, the present invention provides an apparatus for applying grease comprising: a housing; a receiving unit connected to the housing; a grease dispensing hose extending from the housing; and, an adapter comprising a body having a threaded aperture, a non-threaded aperture, and a light source secured within the non-threaded aperture.

In an eleventh embodiment, the present invention provides an apparatus for applying grease as in the tenth embodiment, wherein the threaded aperture of the adapter is designed to mate with a distal end of the grease dispensing hose.

In a twelfth embodiment, the present invention provides an apparatus for applying grease as in any of the tenth through eleventh embodiments, wherein the grease dispensing hose further comprises a dispensing nozzle attached to the distal end of the grease dispensing hose, and a control switch adjacent to the dispensing nozzle.

In a thirteenth embodiment, the present invention provides an apparatus for applying grease as in any of the tenth through twelfth embodiments, further comprising a handle extending from the housing.

In a fourteenth embodiment, the present invention provides an apparatus for applying grease as in any of the first through thirteenth embodiments, further comprising a pump located within the housing, wherein the pump provides pressurized grease to the grease dispensing hose.

In a fifteenth embodiment, the present invention provides an apparatus for applying grease as in any of the tenth through fourteenth embodiments, wherein the receiving unit receives a grease cartridge so as to provide grease to the pump.

In a sixteenth embodiment, the present invention provides an apparatus for applying grease as in any of the tenth through fifteenth embodiments, wherein the body of the adapter further comprises a front side, a back side, two side portions, and rounded top and bottom portions.

In a seventeenth embodiment, the present invention provides an apparatus for applying grease as in any of the tenth through sixteenth embodiments, wherein the non-threaded aperture of the adapter has a front opening on the front side of the body, and a back opening on the back side of the body, and wherein the diameter of the front opening is larger than the diameter of the back opening.

In an eighteenth embodiment, the present invention provides an apparatus for applying grease as in any of the tenth through seventeenth embodiments, further comprises a setscrew located on one of the two side portions adjacent to the non-threaded aperture.

In a nineteenth embodiment, the present invention provides an apparatus for applying grease as in any of the tenth through eighteenth embodiments, wherein the light source is secured within the non-threaded aperture by a back end of the light source being frictionally fit within the back opening of the non-threaded aperture and further being secured by a setting of the setscrew such that a front end of the light source extends out of the adapter through the front opening of the non-threaded aperture.

In a twentieth embodiment, the present invention provides an apparatus for applying grease as in any of the tenth through nineteenth embodiments, wherein the light source is a LED flashlight.

BRIEF DESCRIPTION OF THE DRAWINGS

FIG. 2 shows a back perspective view of an embodiment of an adapter for a grease gun of the present invention;

FIG. 3 shows a front perspective view of an embodiment of an adapter for a grease gun of the present invention;

FIG. 4 shows a side perspective view of an embodiment of an adapter for a grease gun of the present invention having a light source coupled thereto.

DETAILED DESCRIPTION OF ILLUSTRATIVE EMBODIMENTS

An adapter to be attached to the nozzle of a grease gun so as to provide a light source is provided, as well as a method for attaching the adapter to a grease gun.

Figure 1:
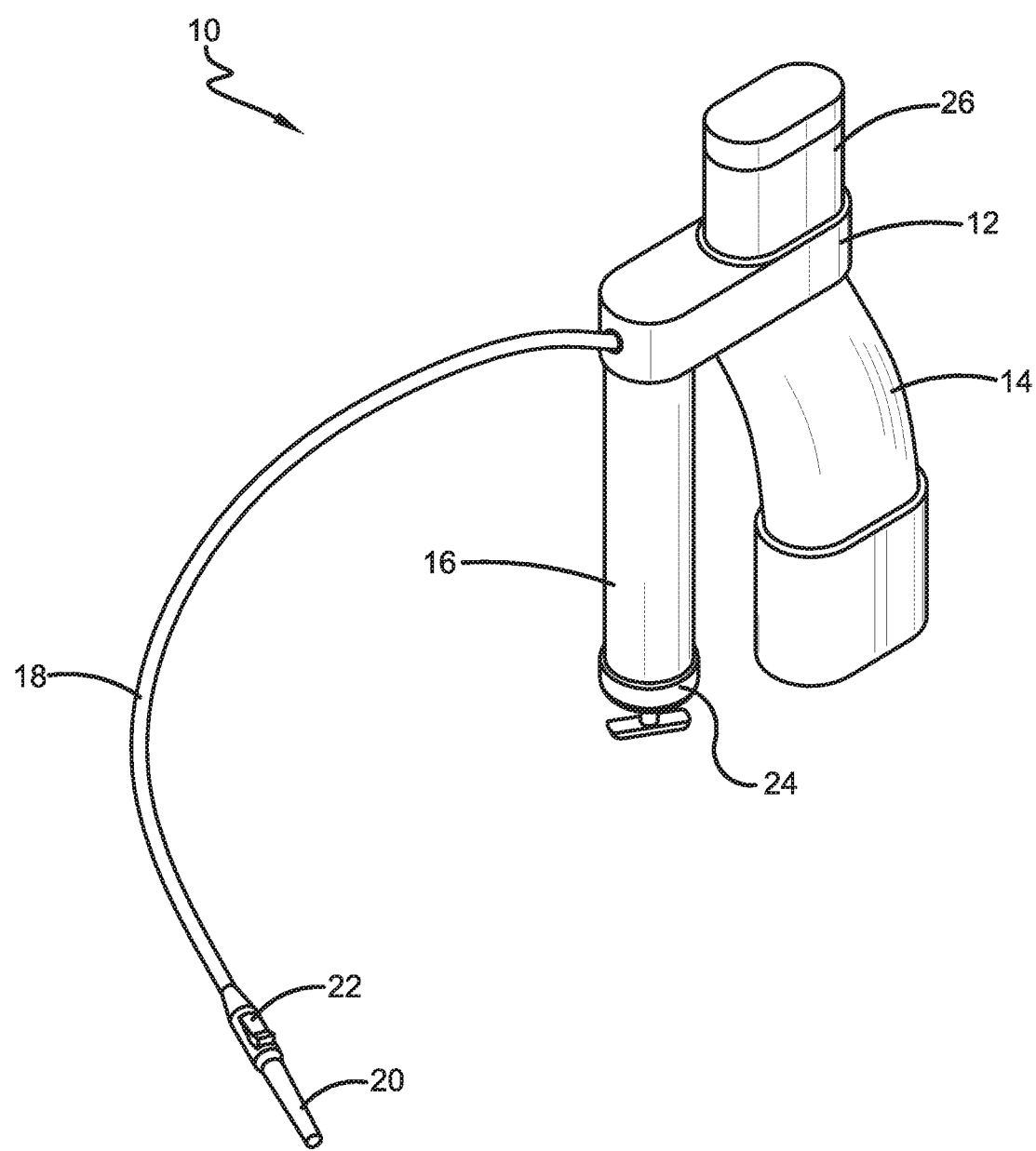
FIG. 1 shows a perspective view of a conventional grease gun.

FIG. 1 shows a typical battery powered grease gun 10. The exemplary grease gun 10 preferably has a housing 12, a handle 14 extending from the housing 12, a receiver unit 16 connected to the housing 12, and a dispensing hose 18 extending from the housing 12. A dispensing nozzle 20 is attached to a distal end of the dispensing hose 18 and a control switch 22 is attached to or adjacent to the dispensing nozzle 20 to control the output of the grease gun 10. Receiver unit 16 receives a grease cartridge 24 and provides grease to the pump (not shown) located within the housing 12 and connected to the motor 26. The pump provides pressurized grease to the dispensing hose 18 that is fluidly connected to the pump.

FIGS. 2 and 3 show an adapter 30 contemplated by the present invention. Adapter 30 has a body 31, a front portion 34, a back portion 32, two flat side portions 36, and rounded top and bottom portions 38. Adapter 30 further comprises a threaded aperture 40, a non-threaded aperture 42 having a front opening 44 and a back opening 46, and a setscrew 48 located on one of the two sides 36 of adapter 30. The location of setscrew 48 is such that it is adjacent to the non-threaded aperture 42.

Threaded aperture 40 is sized so as to mate with a dispensing nozzle of a grease gun, such as dispensing nozzle 20 of the grease gun 10 shown in FIG. 1. The mating of the adapter 30 to the dispensing hose 18 using the threaded aperture 40 will be explained in more detail below.

The back opening 46 of the non-threaded aperture 42 is located on the back 32 of adapter 30, and the front opening 44 of the non-threaded aperture 42 is located on the front 34 of adapter 30. In one embodiment, back opening 46 has a larger diameter than the diameter of the front opening 44.

As shown in FIG. 4, the proportional relationship of the back opening 46 and the front opening 44 is such that a light source 50 can be held within the non-threaded aperture 42. The light source 50 will be held within the non-threaded aperture 42 by the back end 52 of the light source 50 being secured within the back opening 46 by means of setscrew 48, so that the front end 54 of the light source 50 that contains the light or bulb 56 will lie within the front opening 44. Once the light source 50 is placed within the non-threaded aperture 42, setscrew 48 can be tightened to engage and keep the light source 50 in place. In one or more embodiments, light source 50 is a LED flashlight wherein the back end 52 of the light source contains an ON/OFF mechanism 56.

Figure 5:
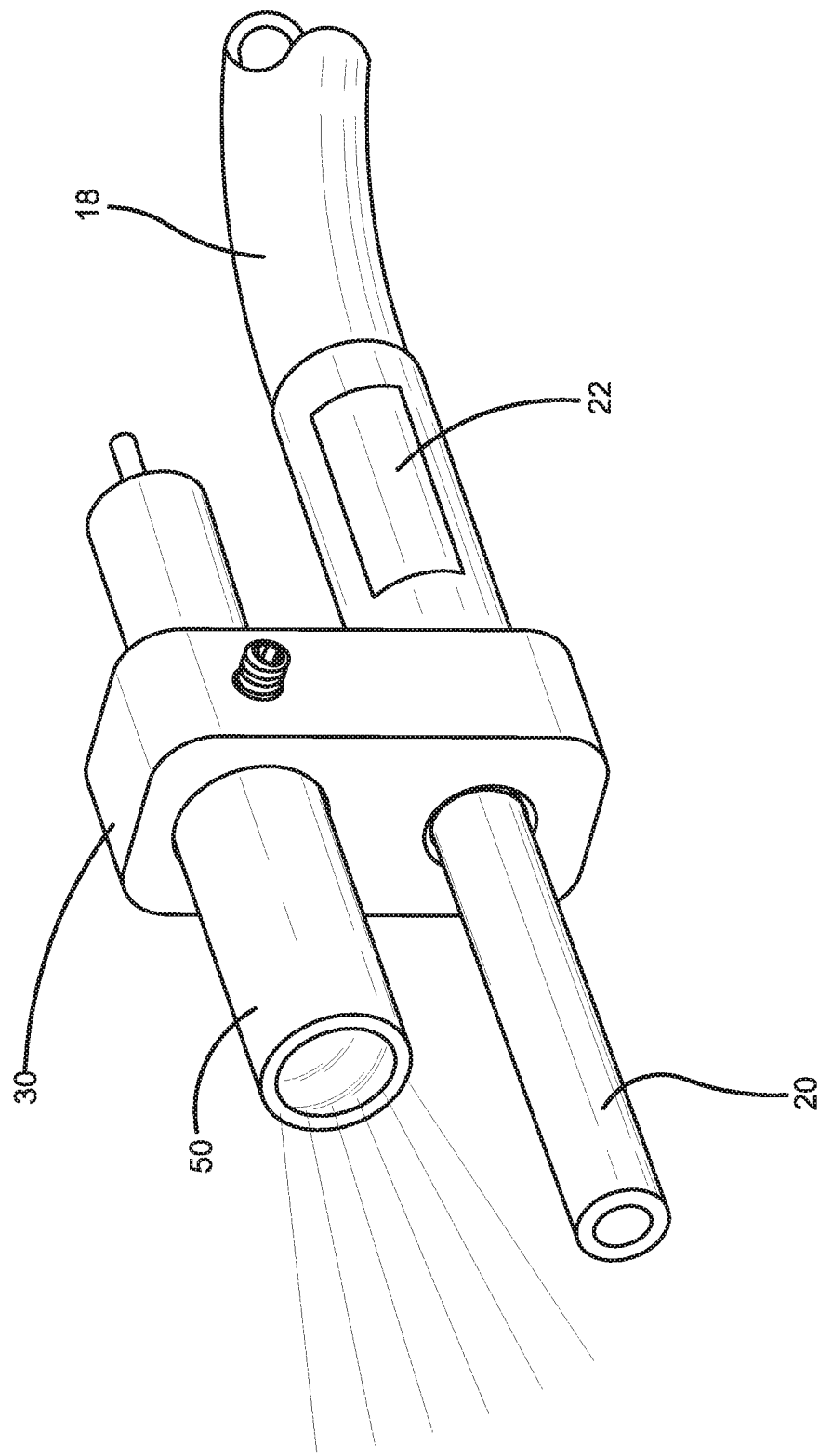
FIG. 5 shows a perspective view of an embodiment of an adapter for a grease gun of the present invention coupled to a dispensing hose of a grease gun.

Once a light source 50 is secured within adapter 30, the adapter 30 is ready to be coupled to a dispensing hose 18 of grease gun 10 as shown in FIG. 5, although in some embodiments, the light source 50 can be secured within adapter 30 after adapter 30 has been coupled to a grease gun 10. To secure the adapter 30 to a grease gun, the dispensing nozzle 20 must first be removed from the dispensing hose. On a typical grease gun, such as grease gun 10, the dispensing nozzle 20 is attached to the dispensing hose 20 using a simple thread relationship wherein the dispensing hose 18 typically contains external threads, and the dispensing nozzle 20 contains internal threads. Once the dispensing nozzle 20 is removed, the adapter 30 is coupled to the dispensing hose 18 using the threaded aperture 40, which will typically contain internal threads which will be able to mate with the external threads of the dispensing hose 18. The dispensing hose 18 will now extend out of the threaded aperture 40, with the adapter 30 now coupled to the dispensing hose 18. Once the adapter 30 is coupled to the dispensing hose 18, the dispensing nozzle 20 can then be threaded onto the remaining external threads of the dispensing hose 18 extending out of the threaded aperture 40. Although dispensing hose 18 is shown as being a flexible hose, it is also contemplated that adapter 30 of the present invention can be used with a grease gun employing a rigid dispensing hose.

Once installation of adapter 30 is complete, a user of the grease gun 10 will now be able to turn on the light source 50 using the ON/OFF mechanism 56 and be able to properly see the grease fitting that grease needs to be applied to. Furthermore, if the light source 50 either dies or burns out, the design of the adapter allows for simple replacement of the used light source 50 with a new light source 50, without removal of the adapter 30 from the grease gun 10. The user simply loosens setscrew 48, removes the used light source 50 from the non-threaded aperture 42, and installs a new light source 50 as described above.

In light of the foregoing, it should be appreciated that the present invention significantly advances the art by providing an illumination means for a grease gun that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An adapter for a grease gun, comprising: an integral body having a first threaded aperture passing therethrough, a second non-threaded aperture passing therethrough; a light source secured within the non-threaded aperture; and wherein the first threaded aperture is configured to mate with a distal end of a dispensing hose of a grease gun.

2. The adapter of claim 1 wherein the body further comprises a front side, a back side, two side portions, and rounded top and bottom portions.

3. The adapter of claim 2 wherein the second non-threaded aperture has a front opening on the front side of the body, and a back opening on the back side of the body, and wherein the diameter of the front opening is larger than the diameter of the back opening.

4. The adapter of claim 2 wherein the body further comprises a setscrew located on one of the two side portions adjacent to the second non-threaded aperture.

5. The adapter of claim 4 wherein the light source is secured within the first non-threaded aperture by a back end of the light source being frictionally fit within the back opening of the first non-threaded aperture and further being secured by a setting of the setscrew such that a front end of the light source extends out of the adapter through the front opening of the first non-threaded aperture.

6. The adapter of claim 1 wherein the light source is a LED flashlight.

7. A method of attaching a light source adapter to a dispensing hose of a grease gun, comprising:
   a. unscrewing a dispensing nozzle from a distal end of the dispensing hose;
   b. threadedly coupling the light source adapter onto the distal end of the dispensing hose, the adapter comprising a body having a first threaded aperture, a second non-threaded aperture, the light source being threadedly secured within the first non-threaded aperture such that the distal end of the dispensing hose extends out of the adapter once the adapter is coupled to the dispensing hose; and
   c. screwing the dispensing nozzle onto the distal end of the dispensing hose extending out of the adapter.

8. The method of claim 7 wherein the dispensing hose is coupled to the adapter by means of the first threaded aperture.

9. An apparatus for applying grease, comprising:
   a. a housing;
   b. a receiving unit connected to the housing;
   c. a grease dispensing hose extending from the housing;
   d. an adapter comprising an integral a body having a first threaded aperture passing therethrough and a second a non-threaded aperture passing therethrough with a light source secured within the non-threaded aperture; and
   e. wherein the first threaded aperture of the adapter is designed to mate with a distal end of the grease dispensing hose.

10. The apparatus of claim 9 wherein the grease dispensing hose further comprises a dispensing nozzle attached to the distal end of the grease dispensing hose, and a control switch adjacent to the dispensing nozzle.

11. The apparatus of claim 9 further comprising a handle extending from the housing.

12. The apparatus of claim 9 further comprising a pump located within the housing, wherein the pump provides pressurized grease to the grease dispensing hose.

13. The apparatus of claim 12 wherein the receiving unit receives a grease cartridge so as to provide grease to the pump.

14. The apparatus of claim 9 wherein the body of the adapter further comprises a front side, a back side, two side portions, and rounded top and bottom portions.

15. The apparatus of claim 14 wherein the second non-threaded aperture of the adapter has a front opening on the front side of the body, and a back opening on the back side of the body, and wherein the diameter of the front opening is larger than the diameter of the back opening.

16. The apparatus of claim 14 wherein the body of the adapter further comprises a setscrew located on one of the two side portions adjacent to the second non-threaded aperture.

17. The apparatus of claim 16 wherein the light source is secured within the second non-threaded aperture by a back end of the light source being frictionally fit within the back opening of the second non-threaded aperture and further being secured by a setting of the setscrew such that a front end of the light source extends out of the adapter through the front opening of the second non-threaded aperture.

18. The apparatus of claim 9 wherein the light source is a LED flashlight.

\* \* \* \* \*